United States Patent [19]
Wooten et al.

[11] Patent Number: 5,779,771
[45] Date of Patent: Jul. 14, 1998

[54] ROTATING FLOW DISTRIBUTOR ASSEMBLY FOR USE IN CONTINUOUSLY DISTRIBUTING DECONTAMINATION AND REGENERATION FLUID FLOW

[75] Inventors: Russell C. Wooten; Paul E. Vargas; Andrew N. Andrascik, all of Vero Beach, Fla.

[73] Assignee: Calgon Carbon Corporation, Pittsburgh, Pa.

[21] Appl. No.: 714,678

[22] Filed: Sep. 16, 1996

Related U.S. Application Data

[63] Continuation-in-part of Ser. No. 554,860, Nov. 7, 1995, Pat. No. 5,681,376.
[51] Int. Cl.⁶ .................................................. B01D 53/04
[52] U.S. Cl. ............................ 96/124; 96/130; 210/278
[58] Field of Search ........................ 96/108, 124, 130–133, 96/144; 210/264, 275, 277, 278, 333.1

[56] References Cited

U.S. PATENT DOCUMENTS

| | | | |
|---|---|---|---|
| 769,143 | 9/1904 | Boellinghaus | 210/284 X |
| 1,971,131 | 8/1934 | Cornetto | 96/124 |
| 2,204,431 | 6/1940 | Moore et al. | 96/124 |
| 2,751,032 | 6/1956 | Ringo et al. | 96/124 |
| 2,751,033 | 6/1956 | Miller | 96/124 |
| 3,547,270 | 12/1970 | Kass | 210/264 |
| 3,578,167 | 5/1971 | Clack et al. | 210/253 X |
| 3,679,060 | 7/1972 | Smith | 210/333.1 |
| 3,713,538 | 1/1973 | Kass | 210/277 X |
| 4,062,777 | 12/1977 | Tsuruta et al. | 96/130 X |
| 4,430,220 | 2/1984 | Litzenburger | 210/333.1 |
| 4,469,494 | 9/1984 | van Weenen | 96/124 |
| 5,133,784 | 7/1992 | Boudet et al. | 96/130 X |

FOREIGN PATENT DOCUMENTS

| | | | |
|---|---|---|---|
| 4315578 | 11/1994 | Germany | 96/130 |
| 38-004315 | 4/1963 | Japan | 96/124 |
| 60-132622 | 7/1985 | Japan | 96/124 |
| 1230648 | 5/1986 | U.S.S.R. | 96/133 |
| 0508372 | 6/1939 | United Kingdom | 96/124 |

*Primary Examiner*—Robert Spitzer
*Attorney, Agent, or Firm*—Titus & McConomy

[57] ABSTRACT

The rotating flow distributor assembly comprises a connected pair of cylindrical housings, with an inlet port and an outlet port, that receive and discharge the flow of fluid undergoing decontamination. The fluid passes into flow distribution chambers located at the inlet end and outlet end of the assembly, each of which houses a rotating flow diverter, which direct the fluid through the contaminant removal medium. Each flow distribution chamber is ringed by a set of openings distributed evenly around the circumference of the respective housing, through which the flow diverters distribute the fluid into the individual containers of the decontamination medium bed. Simultaneous with the distribution of contaminated fluid through the decontamination medium bed, the flow diverters direct regeneration fluid flow through a container of the decontamination medium bed to remove the impurities from the contaminant removal medium. The rotating flow diverters are stepped through their 360 degree rotation in phase to sequentially regenerate a single decontamination medium bed container at a time. The regeneration takes place in this single decontamination medium bed container while the other decontamination medium bed containers are simultaneously accomplishing contaminant removal.

9 Claims, 5 Drawing Sheets

ROTATING FLOW DISTRIBUTOR ASSEMBLY FOR USE IN CONTINUOUSLY DISTRIBUTING DECONTAMINATION AND REGENERATION FLUID FLOW

FIELD OF THE INVENTION

This application is a continuation-in-part of U.S. patent application Ser. No. 08/544,860, filed Nov. 7, 1995, now U.S. Pat. No. 5,681,376. The present invention relates to an apparatus for continuously distributing fluid flow in industrial applications which may require removal of contaminants from a fluid stream. In particular, this invention is intended for use in the continuous removal of volatile organic compounds (VOCs) from a point source thereof, and for simultaneous regeneration of the adsorbent used in their removal. Other applications for use of the invention are also possible, such as in a water backflushing operation for the removal of sludge and other solid pollutants from liquids.

BACKGROUND OF INVENTION

Methods and apparatus for the removal of contaminants, in particular, volatile organic compounds ("VOC") from air streams are very well known. Typical of such systems is the use of activated carbon for the removal of VOCs and the use of a heated regeneration gas for desorbing the adsorbed VOCs from the adsorbent. To provide a substantially continuous removal process, at least two adsorber vessels are used in which one adsorber is adsorbing the VOCs from the gas stream while the other adsorber is being regenerated for use. In some cases more than two vessels are used to enhance the continuity of the system's performance.

The apparatus and methods of the prior art that are used for VOC removal from the commercial gas stream provide satisfactory removal rates. However, these processes require the use of large stationary systems with a complex network of piping systems, a large number of valves to control fluid flow, and high flow rates of hot desorption (regenerative) gases.

Accordingly, it is an object of the present invention to provide a method and apparatus for the efficient removal of contaminants from fluid streams using a single rotating flow distribution assembly, connected to multiple containers of adsorbent material, which eliminates the need for a complex valve and piping network to accomplish fluid decontamination.

It is yet a further object of the invention to provide an apparatus which is capable of simultaneous fluid decontamination and contaminant removal medium regeneration using a single rotating flow distribution assembly.

It is a further object of the invention to provide an apparatus for the removal of fluid contaminants which minimizes the number of components necessary to accomplish decontamination, and which can be made portable and capable of being attached to point sources of contaminant generation.

It is another object of this invention to provide a method and apparatus for a water backflush that accomplishes the removal of sludge and other solid pollutants from liquids.

SUMMARY OF THE INVENTION

The rotating flow distributor assembly comprises a connected pair of cylindrical housings, one with an inlet port and the other with an outlet port, that receive and discharge the flow of fluid undergoing decontamination. The fluid passes into flow distribution chambers located at the inlet end and outlet end of the assembly, each of which houses a rotating flow diverter, which direct the fluid through the contaminant removal medium. The contaminant removal medium is preferably divided into a number of individual containers. Each flow distribution chamber is ringed by a set of openings which are preferably distributed evenly around the circumference of the housing and through which the flow diverters distribute the fluid into the individual containers of the decontamination medium bed. Simultaneous with the distribution of contaminated fluid through the decontamination medium beds, the flow diverters direct regeneration fluid flow through a container of the decontamination medium bed to remove the impurities from the contaminant removal medium. The rotating flow diverters are sequentially stepped in phase through 360 degrees of rotation to regenerate a single decontamination medium bed container at a time. The regeneration takes place in this single decontamination medium bed container while the other decontamination medium bed container are simultaneously accomplishing contaminant removal. Other details, objects, and advantages of the present invention will become apparent in the following description of the presently preferred embodiments.

BRIEF DESCRIPTION OF THE DRAWINGS

FIG. (1) is a side view of the flow distributor assembly attached to the fluid decontamination medium bed containers.

FIG. (2) is an overhead view of the decontamination medium bed containers connected to the flow distributor assembly.

FIG. (3) is a side view of the interior of the flow distributor assembly.

FIG. (4) is a side view of the interior of a flow diverter.

FIG. (5) is an overhead view of a flow diverter as it is assembled into a flow distribution chamber.

DETAILED DESCRIPTION OF THE PREFERRED EMBODIMENT

Figure 1:
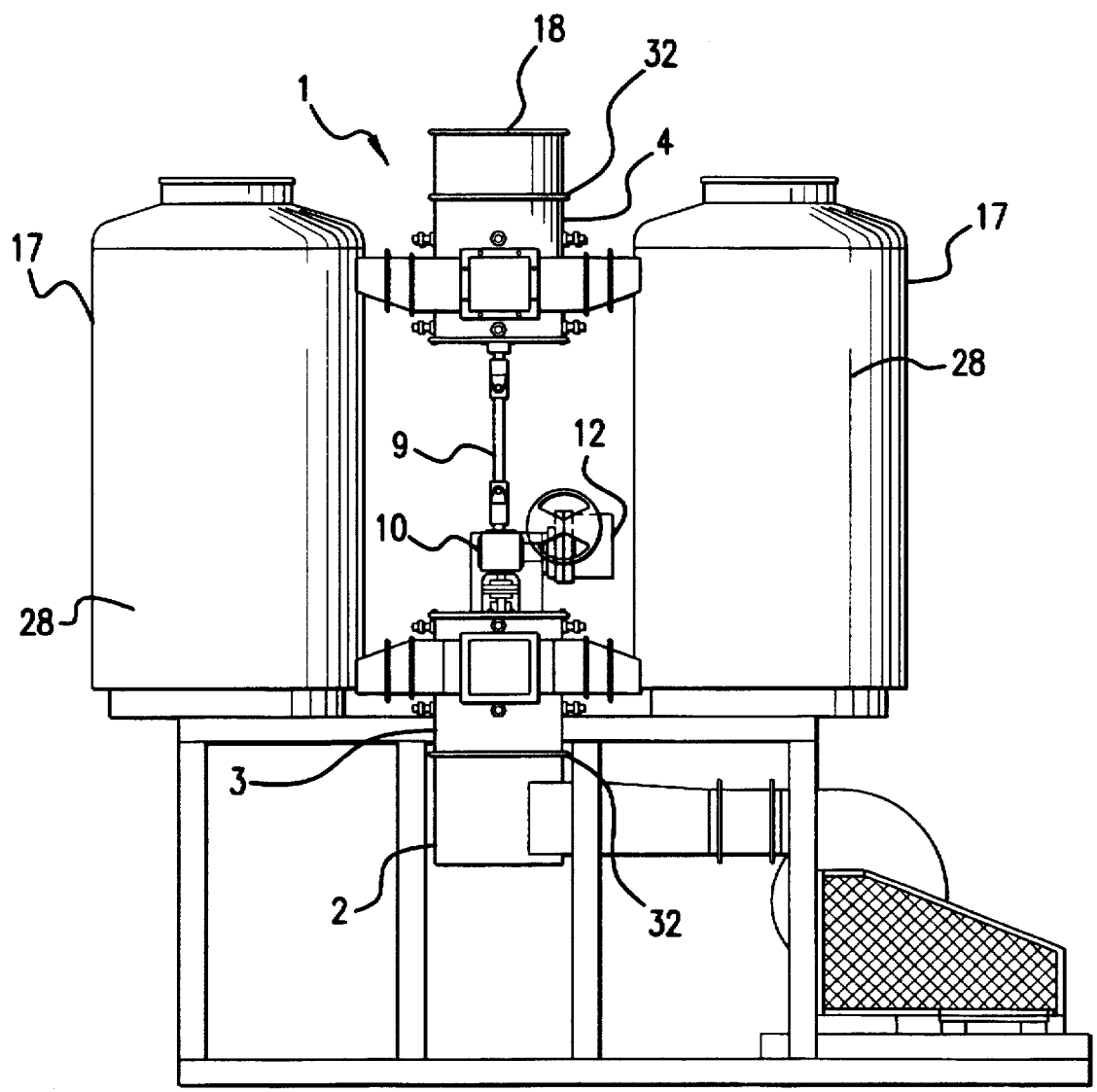
Figure 2:
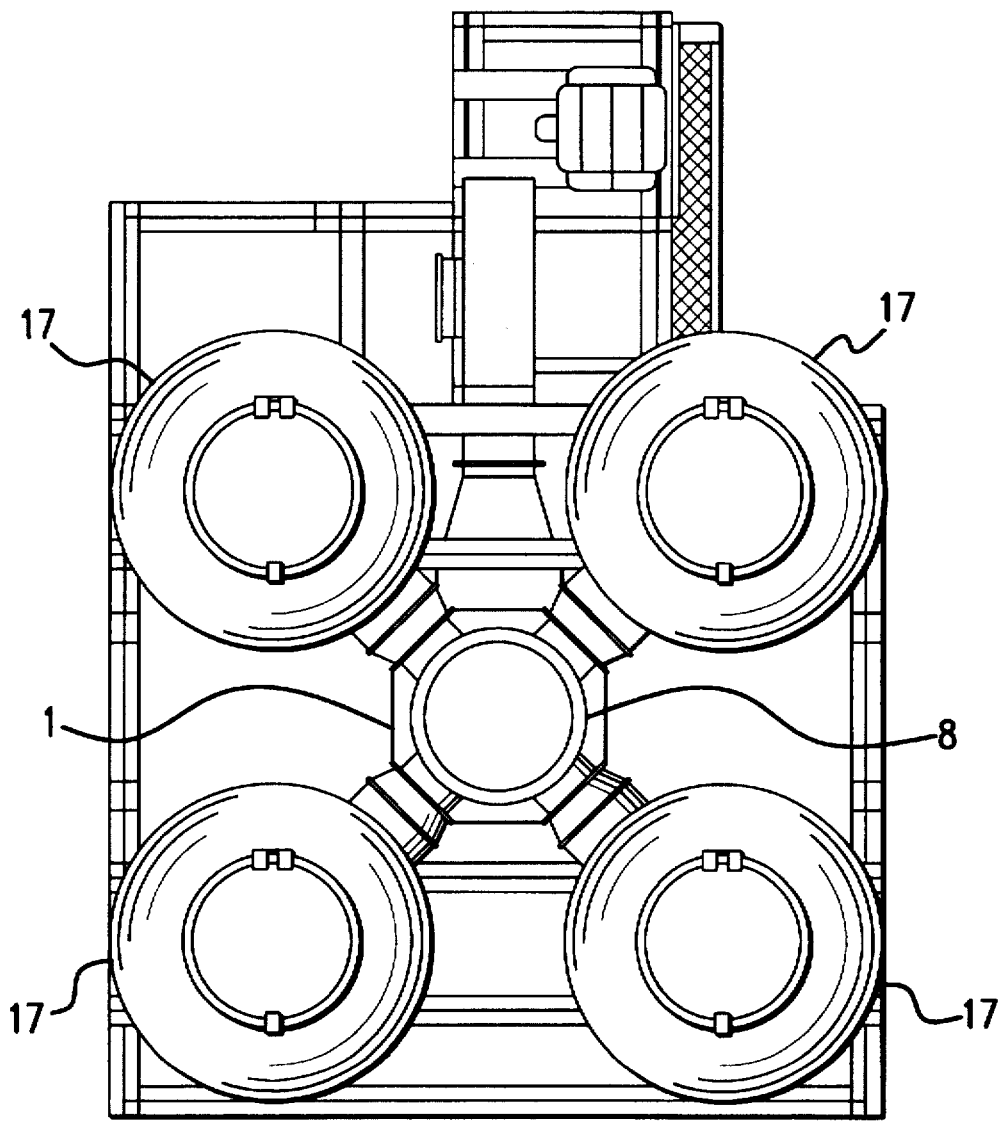
Figure 3:
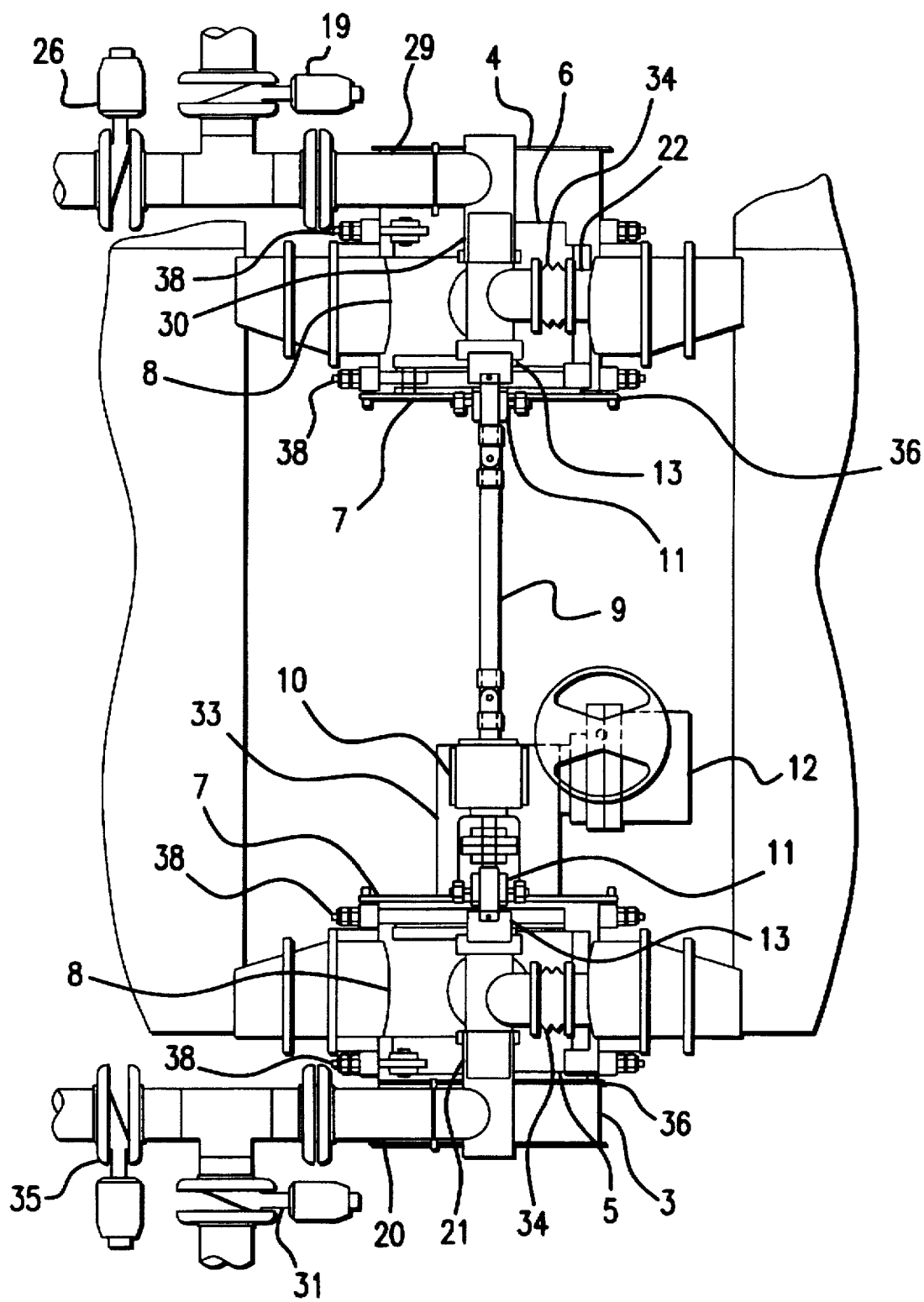
Figure 4:
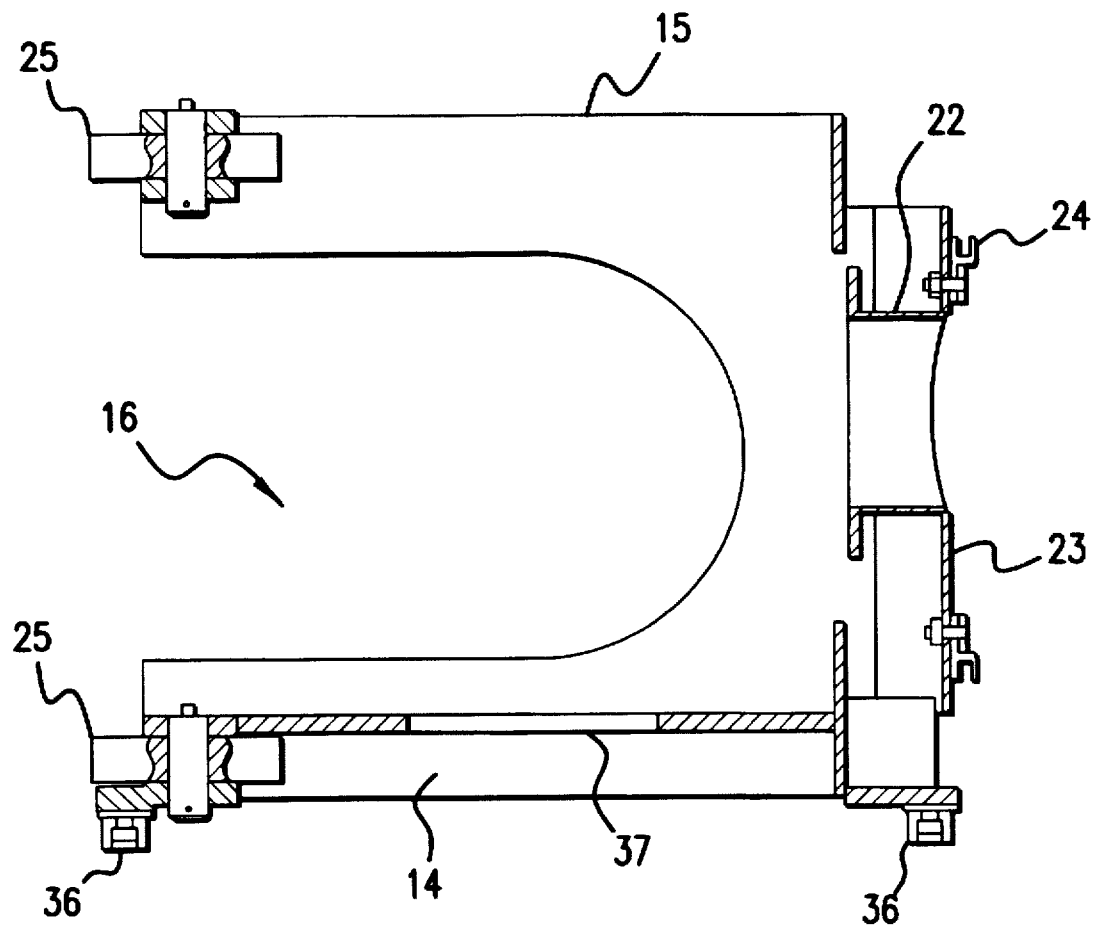
Figure 5:
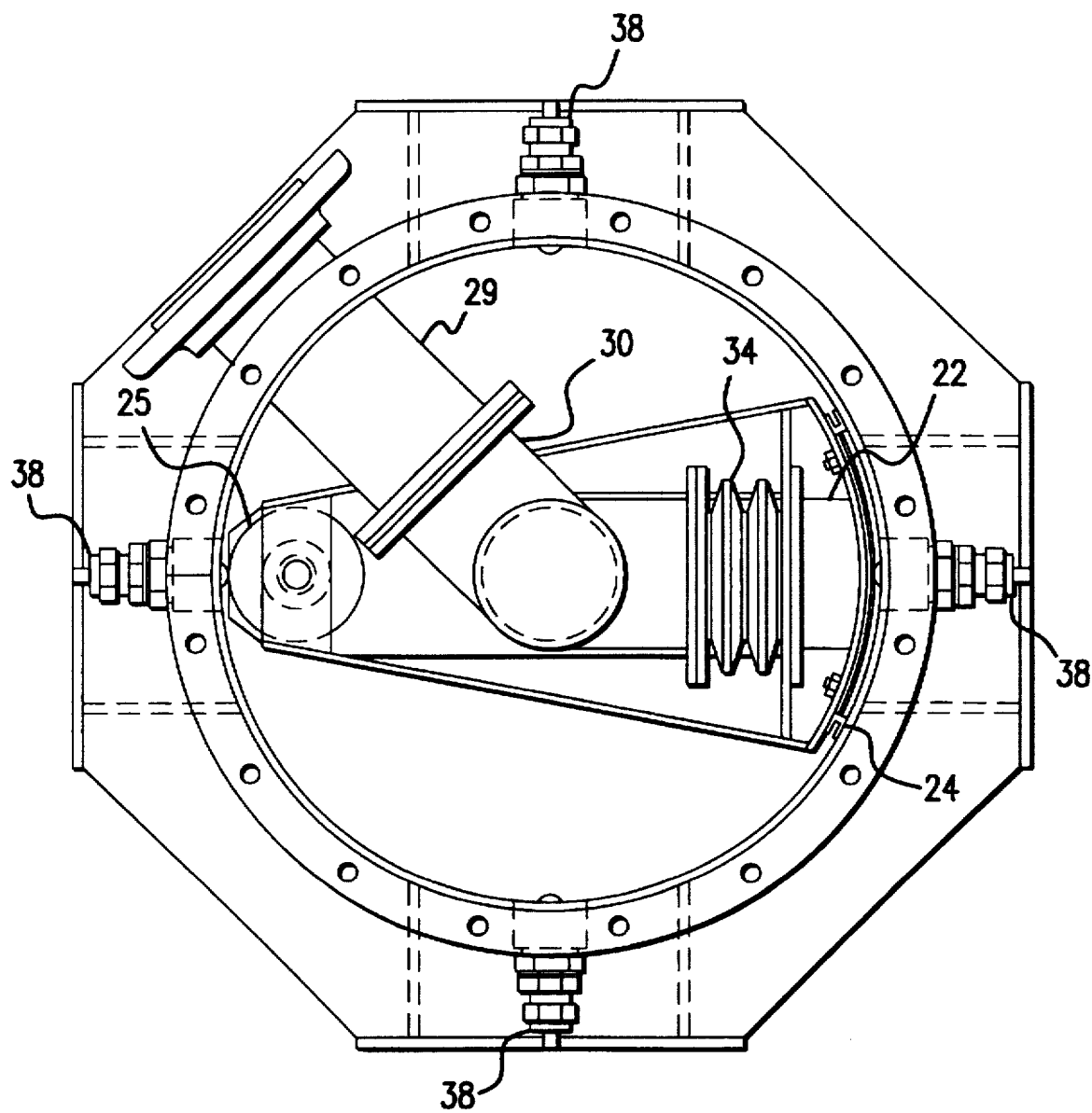

Referring to FIGS. (1), (2) and (3) the preferred embodiment of the rotating flow distributor assembly 1 comprises a connected pair of metal housings, one with an inlet port 2 and the other with an outlet port 18, that receive and discharge the flow of fluid undergoing decontamination. The fluid passes through two flow distribution chambers 3 and 4 located at either end of the assembly 1, each of which houses a rotating flow diverter 5 and 6, which direct the fluid through the contaminant removal medium. Each flow distribution chamber 3 or 4 is ringed by a set of openings 8 distributed evenly around the circumference through which the flow diverters 5 and 6 distribute the fluid into the individual containers 17 of the decontamination medium bed 28, shown in FIG. 1 and 2. Simultaneous with the distribution of contaminated fluid through the containers of the decontamination medium bed 28, the flow diverters 5 and 6 direct regeneration fluid flow through a container 17 of the decontamination medium bed 28 to remove the impurities from the contaminant removal medium. The rotating flow diverters 5 and 6 are stepped through their 360 degree rotation in phase to sequentially regenerate a single decontamination medium bed container 17 at a time. The regeneration takes place in this single decontamination medium bed container while the other decontamination medium bed containers are simultaneously accomplishing contaminant removal.

Referring to FIGS. (1), (2) and (3), the rotating flow distributor assembly 1 is preferably bolted to the inlet and outlet flanges of the containers 17 containing the contaminants removal medium 28. Flanged disconnects 32, facilitate removal of the interior components of the flow distributor assembly, resulting in portability and maintainability. The interior of the assembly 1 contains a drive shaft 9 and a rotation means 10, which are mounted on bracket 33 that is welded to a plate bolted to flow distributor chamber 3. The drive shaft 9 is connected to the two flow diverters 5 and 6, which each rotate 360 degrees about the center axis of the assembly 1. The drive shaft is mounted to a bearing 11 that forms a seal at the opening in the center of the metal disc 7 to prevent incoming fluid from escaping the flow distribution chambers 3 and 4. In the preferred embodiment, the rotation means 10 is a geared transmission assembly which is mechanically linked to an actuator 12, as shown in FIGS. (1) and (3). The actuator 12 in the preferred embodiment is electrical, using limit switches to control the movement of the rotation means 10. However, a hand crank is also provided as a backup means of actuator 12 operation.

Referring to FIGS. (4) and (5), each flow diverter 5 or 6 has a casing which is constructed of two metal ribs 14 jointed by an integral closed face 23. The two ribs 14 form a hollow slot 16 which borders the hollow interior 15 of each flow diverter 5 or 6. This slot 16 is in communication with the openings 8 in the flow distribution chambers 3 and 4. This communication creates the path through which flow takes place from the flow distributor assembly 1 into the decontamination medium bed 28. Referring to FIGS. (3) and (4), each flow diverter 5 or 6 is kept in place inside its respective flow distribution chamber 3 or 4 by Teflon support liners 36, which provide surfaces on which each flow diverter 5 or 6 rotates. Referring to FIGS. (3) and (4), each flow diverter 5 or 6 is connected to the drive shaft 9 by means of a preferably rectangular drive plate 13, which mechanically engages slot 37 in each flow diverter 5 and 6.

Referring to FIGS. (1), (3) and (4), decontamination flow enters the flow distributor assembly through the inlet port 2, where it passes into the inlet flow distribution chamber 3. Once the decontamination flow has entered the inlet flow distribution chamber 3, it enters in and around the hollow opening 15 of inlet flow diverter 5. It is then directed out of the inlet flow diverter 5 through and around slot 16, and into a container 17 of the decontamination medium bed 28 through an opening 8 of the inlet flow distribution chamber 3. Decontaminants are removed as the decontamination flow passes through a container 17 of the decontamination medium bed 28. The decontaminated flow is then directed back through an opening 8 in the outlet flow distribution chamber 4, into and around the slot 16 of the outlet flow diverter 6. The decontaminated flow is then directed out through and around the hollow opening 15 of the outlet flow diverter 6, and exhausted out of an exhaust port 18 at the top of the flow distributor assembly housing.

Referring to FIG. (3), the hollow opening 15 of each flow diverter 5 or 6 contains a pipe 20 or 29 through which flow of regeneration medium takes place to remove the impurities from the decontamination medium bed 28. One end of this regeneration pipe 20 or 29 passes through the flow diverter hollow opening 15, where it is connected to a rotatable swivel joint 21 or 30. The other end of the regeneration pipe 20 or 29 is attached to either the inlet port 2 or the exhaust port 18 of the flow distributor assembly. A swivel joint 21 or 30 is attached to the wall of a flow distribution chamber 3 or 4.

Referring to FIGS. (4) and (5), a flexible face seal 24, surrounds the penetration end 22 of the flow diverter 5 or 6 which directs the regeneration flow through the segment 17 of the decontamination medium bed 28 undergoing regeneration. This face seal 24 is forced against the flow distribution chamber opening 8 in contact with the flow diverter closed face 23, sealing the penetration end 22 of the the flow diverter 5 or 6 to the container 17 of the decontamination medium bed 28 undergoing regeneration. This forcing action is provided by a pair of [cam] rollers 25, mounted to each flow diverter 5 or 6. The rollers 25, shown in FIGS. (4) and (5), ride up on the ends of adjusting screws 38 to shift the flow diverter 5 or 6 towards the flow distribution chamber openings 8 to compress the seal 24. The seal formed by this action isolates the container 17 of the decontamination medium bed 28 undergoing regeneration from the other containers which are simultaneously accomplishing decontamination. The face seal 24 is made of Teflon in the preferred embodiment, but can be made of any material suitable to form a seal between the flow distribution chamber opening 8 and the penetration end 22 of the flow diverter 5 or 6 being sealed. A flexible connection 34 between the fixed swivel joint 21 or 30 and penetration end 22 of the flow diverter 5 or 6 facilitates the radial movement of the diverter 5 or 6 into and out of sealing position.

Referring again to FIG. (3), the regeneration flow enters the flow distributor assembly 1 through the regeneration supply valve 26, while the conditioning flow exhaust valve 19 is closed to prevent regeneration flow from escaping. Regeneration flow enters the outlet regeneration pipe 29 through the swivel joint 30 connected to the outlet flow distribution chamber 4, where it is directed through the penetration end 22 of the outlet flow diverter 6 into the container 17 of the decontamination medium bed 28 undergoing regeneration. Regeneration flow then removes the contaminants from the container 17 of the decontamination medium bed 28 undergoing regeneration, after which the regeneration flow passes through the inlet flow distribution chamber 3 into the penetration end 22 of the inlet flow diverter 5. The contaminants contained in the regeneration flow are then removed by passing the regeneration flow through the swivel joint 21 connected to the inlet port 2, where it exits through the inlet regeneration pipe 20 out of the flow distributor assembly housing 1.

Referring finally to FIG. (3), the conditioning flow inlet valve 31 and conditioning flow exhaust valve 19 are used to direct conditioning flow through the decontamination medium bed 28. Conditioning flow inlet valve 31 and conditioning flow exhaust valve 19 are open when regeneration supply valve 26 and regeneration exhaust valve 35 are closed. Conditioning flow is periodically necessary to assist in contamination removal efficiency. While presently preferred embodiments of practicing the invention have been shown and described with particularity in connection with the accompanying drawings, the invention may otherwise be embodied within the scope of the following claims.

What is claimed is:

1. A rotating flow distributor assembly for use in continuously distributing fluid flow, comprising:
   A. a connected pair of housings forming a first end of said assembly and a second end of said assembly opposite said first end having:
      (i) an inlet port,
      (ii) an exhaust port spaced apart from said inlet port,
      (iii) a first flow distribution chamber located at said first end of said assembly and a second flow distribution chamber located at said second end of said assembly, each of said flow distribution chambers having a hollow interior, and
      (iv) a plurality of openings within each of said flow distribution chambers distributed circumferentially around said housing;

B. a first flow diverter located within said interior of said first flow distribution chamber, and a second flow diverter located inside said interior of said second flow distribution chamber, each said flow diverter rotating about a center axis of said assembly;

C. a rotatable drive shaft, extending through said assembly, connecting said flow diverters; and D. a means for rotating said drive shaft; wherein each said flow diverter comprises:
 (i). a casing having a hollow interior and a single closed end that sequentially abuts each opening of said flow distribution chamber as said flow diverter rotates:
 (ii). a pipe located inside said interior having:
  (a) a rotatable first end which connects said pipe to either said inlet port or said exhaust port of said housing
  (b) a second end which is connected to said closed end of said casing: and
 (iii). a seal covering said pipe second end which forms a seal against the opening of said flow distribution chamber in contact with said closed end of said casing.

2. The rotating flow distributor assembly of claim 1, further comprising:
 A. flanged disconnects at either end of said assembly; and wherein
 said means for rotating said drive shaft comprises a geared transmission assembly.

3. The rotating flow distributor assembly of claim 2, in which the means for rotating said drive shaft is mechanically controlled.

4. The rotating flow distributor assembly of claim 2, in which the means for rotating said drive shaft is electrically controlled.

5. The rotating flow distributor assembly of claim 1, further comprising:
 A. flanged disconnects at either end of said assembly;
 B. a pair of flexible connections, one of which is connected to said pipe, which relax the stress on said pipe as said flow diverter rotates;
 C. two pair of rollers, one pair being mounted on each said flow diverter, which forces said seal against the opening of said flow distribution chamber in contact with said closed end of said casing; and wherein
 said means for rotating said drive shaft comprises a geared transmission assembly.

6. The rotating flow distributor assembly of claim 5, in which the means for rotating said drive shaft is mechanically controlled.

7. The rotating flow distributor assembly of claim 5, in which the means for rotating said drive shaft is electrically controlled.

8. The rotating flow distributor assembly of claim 1 wherein said, in which the means for rotating said drive shaft is mechanically controlled.

9. The rotating flow distributor assembly of claim 1 in which the means for rotating said drive shaft is electrically controlled.

* * * * *